United States Patent [19]
Burts, Jr.

[11] Patent Number: 6,016,871
[45] Date of Patent: Jan. 25, 2000

[54] HYDRAULIC FRACTURING ADDITIVE, HYDRAULIC FRACTURING TREATMENT FLUID MADE THEREFROM, AND METHOD OF HYDRAULICALLY FRACTURING A SUBTERRANEAN FORMATION

[76] Inventor: Boyce D. Burts, Jr., P.O. Box 82007, Lafayette, La. 70598-2007

[21] Appl. No.: 08/962,212

[22] Filed: Oct. 31, 1997

[51] Int. Cl.$^7$ ..................................................... E21B 43/26
[52] U.S. Cl. ........................ 166/300; 166/308; 507/204; 507/903; 507/904; 507/922
[58] Field of Search ..................... 166/280, 283, 166/300, 308; 507/104, 204, 903, 904, 922

[56] References Cited

U.S. PATENT DOCUMENTS

| | | | |
|---|---|---|---|
| 2,610,149 | 9/1952 | VanDyke . | |
| 2,708,973 | 5/1955 | Twining . | |
| 2,779,417 | 1/1957 | Clark et al. . | |
| 3,208,524 | 9/1965 | Horner et al. | 507/903 X |
| 3,374,834 | 3/1968 | Ramos et al. . | |
| 3,408,296 | 10/1968 | Kuhn et al. | 166/283 X |
| 3,462,958 | 8/1969 | Patin et al. . | |
| 3,701,384 | 10/1972 | Routson et al. | 166/292 |
| 3,766,984 | 10/1973 | Nimerick | 166/295 X |
| 3,845,822 | 11/1974 | Clampitt et al. | 166/281 |
| 3,981,363 | 9/1976 | Gall | 166/270 |
| 4,018,286 | 4/1977 | Gall et al. | 166/295 |
| 4,039,029 | 8/1977 | Gall | 166/294 |
| 4,183,406 | 1/1980 | Lundberg et al. | 166/295 |
| 4,247,403 | 1/1981 | Foley et al. . | |
| 4,391,925 | 7/1983 | Mintz et al. | 523/130 |
| 4,474,665 | 10/1984 | Green . | |
| 4,579,668 | 4/1986 | Messenger . | |
| 4,683,949 | 8/1987 | Sydansk et al. | 166/270 |
| 4,722,397 | 2/1988 | Sydansk et al. | 166/295 |
| 4,723,605 | 2/1988 | Sydansk | 166/295 |
| 4,730,674 | 3/1988 | Burdge et al. | 166/295 |
| 4,730,675 | 3/1988 | Wygant et al. | 166/295 |
| 4,744,418 | 5/1988 | Sydansk | 166/295 |
| 4,744,419 | 5/1988 | Sydansk et al. | 166/270 |
| 4,770,245 | 9/1988 | Sydansk | 166/295 |
| 4,779,680 | 10/1988 | Sydansk | 166/300 |
| 4,844,168 | 7/1989 | Sydansk | 166/270 |
| 4,947,935 | 8/1990 | Sydansk | 166/295 |
| 4,957,166 | 9/1990 | Sydansk | 166/295 |
| 4,989,673 | 2/1991 | Sydansk | 166/250 |
| 4,995,461 | 2/1991 | Sydansk | 166/295 |
| 5,004,553 | 4/1991 | House et al. . | |
| 5,065,820 | 11/1991 | Bloys et al. | 166/291 |
| 5,071,575 | 12/1991 | House et al. | 507/104 |
| 5,076,944 | 12/1991 | Cowan et al. | 507/104 |
| 5,118,664 | 6/1992 | Burts, Jr. | 507/104 |
| 5,229,018 | 7/1993 | Forrest | 507/209 |
| 5,246,602 | 9/1993 | Forrest | 166/283 |
| 5,377,760 | 1/1995 | Merrill | 166/295 |
| 5,415,229 | 5/1995 | Sydansk | 166/300 X |
| 5,421,411 | 6/1995 | Sydansk | 166/295 |
| 5,478,802 | 12/1995 | Moradi-Araghi | 507/203 |
| 5,501,275 | 3/1996 | Card et al. | 166/280 |
| 5,599,776 | 2/1997 | Burts, Jr. | 507/104 |

*Primary Examiner*—George Suchfield
*Attorney, Agent, or Firm*—J. M. (Mark) Gilbreth

[57] ABSTRACT

For hydraulic fracturing treatment to increase productivity of subterranean hydrocarbon bearing formation, a hydraulic fracturing additive including a dry mixture of water soluble crosslinkable polymer, a crosslinking agent, and a reinforcing material of fibers and/or comminuted plant materials. The method of forming a hydraulic fracturing fluid includes contacting the additive with water or an aqueous solution, with a method of hydraulically fracturing the formation further including the step of injecting the fluid into the wellbore.

20 Claims, No Drawings

HYDRAULIC FRACTURING ADDITIVE, HYDRAULIC FRACTURING TREATMENT FLUID MADE THEREFROM, AND METHOD OF HYDRAULICALLY FRACTURING A SUBTERRANEAN FORMATION

BACKGROUND OF THE INVENTION

1. Field of the Invention

The present invention relates to hydraulic fracturing additives, to hydraulic fracturing treatment fluids made therefrom, to methods of hydraulically fracturing a well. In another aspect, the present invention relates to hydraulic fracturing additives comprising polymer and fibers or comminuted plant materials, to hydraulic fracturing treatment fluids made therefrom, to methods of hydraulically fracturing a well using such fluids.

2. Description of the Related Art

The productivity or injectivity of a wellbore in fluid communication with a subterranean hydrocarbon-bearing formation may be undesirably low due to a number of causes, including low permeability of the formation rock, placement of casing cement, plugging by previously injected materials, clay damage, or produced fluid damage. Productivity or injectivity may be increased by hydraulically fracturing the formation.

Hydraulic fracturing generally entails injecting a fluid into the wellbore at a sufficient rate and pressure to overcome the tensile strength of the formation and the overburden pressure. The injected fluid creates cracks or fractures extending from the wellbore out into the formation which are usually propped open with a solid proppant entrained in the fluid. The fractures permit the flow of hydrocarbons and other fluids into or out of the wellbore.

U.S. Pat. No. 3,816,151 to Podlas, U.S. Pat. No. 3,938,594 to Rhudy et al and U.S. Pat. No. 4,137,182 to Golinkin disclose hydraulic fracturing processes using a number of crosslinked polymer solutions as fracturing fluids.

U.S. Pat. No. 4,779,680, issued Oct. 25, 1988 to Sydansk, notes that many of the then prior art crosslinking reactions prescribed were very difficult to control. Sydansk further notes that uncontrolled crosslinking can occur too rapidly, producing a non-homogeneous suspension of highly viscous gel balls in a watery solution, or in the other extreme crosslinking can fail to occur at all. In either case, the result is an ineffective fracturing fluid.

Sydansk even further notes that at that time, a process is needed for hydraulically fracturing a subterranean hydrocarbon-bearing formation with a stable homogeneous viscous fracturing fluid having satisfactory performance properties to meet the demands of the fracture treatment.

As a solution to the deficiencies and needs of the prior art, Sydansk, discloses the use of a water soluble carboxylate crosslinking polymer along with a chromic carboxylate complex crosslinking agent as a lost circulation material.

While U.S. Pat. No. 5,377,760, issued Jan. 3, 1995 to Merrill discloses addition of fibers to an aqueous solution of partially hydrolyzed polyacrylamide polymer, with subsequent injection into the subterranean to improve conformance, the requirements of a hydraulic fracturing fluid are so different from a conformance fluid, that such would not necessarily work for hydraulic fracturing treatment.

Additionally, Merrill's conformance treatment method of mixing the fibers with the polymer solution followed by injection, requires a multiplicity of storage and mixing tanks, and a metering system which must be operated during the operation of the well. Specifically, a first tank will store a water and polymer solution, a second tank will store a water and cross-linking solution, and a third tank will be used to mix fibers with polymer solution from the first tank to create a polymer/fiber slurry. This polymer/fiber slurry is then metered from the third tank and combined with crosslinking solution metered from the second tank to the well bore.

Thus, in spite of the advancements in the prior art, there still need for further innovation in the hydraulic fracturing additives.

There is need for further innovation for hydraulic fracturing additives utilizing a water soluble polymer.

There is another need for a hydraulic fracturing additive which would allow for simplification of the mixing equipment.

These and other needs in the art will become apparent to those of skill in the art upon review of this specification, including its drawings and claims.

SUMMARY OF THE INVENTION

It is an object of the present invention to provide for further innovation in hydraulic fracturing additives.

It is an another object of the present invention to provide for further innovation for hydraulic fracturing additives utilizing a water soluble polymer.

It is even another object of the present invention to provide for a hydraulic fracturing additive which would allow for simplification of the mixing equipment.

These and other objects of the present invention will become apparent to those of skill in the art upon review of this specification, including its drawings and claims.

According to one embodiment of the present invention there is provided a hydraulic fracturing additive comprising a dry mixture of water soluble crosslinkable polymer, a crosslinking agent, and a reinforcing material selected from among fibers and comminuted plant materials. In preferred embodiments, the polymer is an a carboxylate-containing polymer and the crosslinking agent is a chromic carboxylate complex. In other preferred embodiments, the reinforcing material may comprise hydrophobic fibers selected from among nylon, rayon, and hydrocarbon fibers, and/or hydrophilic fibers selected from among glass, cellulose, carbon, silicon, graphite, calcined petroleum coke, and cotton fibers. The comminuted plant material is selected from the group of comminuted plant materials of nut and seed shells or hulls of almond, brazil, cocoa bean, coconut, cotton, flax, grass, linseed, maize, millet, oat, peach, peanut, rice, rye, soybean, sunflower, walnut, and wheat; rice tips; rice straw; rice bran; crude pectate pulp; peat moss fibers; flax; cotton; cotton linters; wool; sugar cane; paper; bagasse; bamboo; corn stalks; sawdust; wood; bark; straw; cork; dehydrated vegetable matter; whole ground corn cobs; corn cob light density pith core; corn cob ground woody ring portion; corn cob chaff portion; cotton seed stems; flax stems; wheat stems; sunflower seed stems; soybean stems; maize stems; rye grass stems; millet stems; and mixtures thereof.

According to another embodiment of the present invention, there is provided a method of forming a hydraulic fracturing fluid. The method generally includes taking the above hydraulic fracturing additive and contacting it with water or other aqueous solution.

According to even another embodiment of the present invention, there is provided a method of hydraulically fracturing a formation. The method generally includes contacting the above described hydraulic fracturing additive with water or an aqueous solution to form hydraulic fracturing fluid. The method then includes injecting the hydraulic fracturing fluid into the formation.

These and other embodiments of the present invention will become apparent to those of skill in the art upon review of this specification and claims.

DETAILED DESCRIPTION OF THE INVENTION

The hydraulic fracturing additive of the present invention includes polymer, cross-linking agent and either fibers or comminuted particles of plant materials. In a preferred embodiment of the present invention, the hydraulic fracturing additive is a dry mixture of polymer, cross-linking agent and either fibers or comminuted particles of plant materials.

Any suitable relative amounts of the polymer, crosslinking agent and either fibers or comminuted particles of plant materials may be utilized in the present invention provided that the desired hydraulic fracturing results are achieved. Generally, the fibers or comminuted particles will comprise in the range of about 1 to about 99 weight percent, preferably in the range of about 25 to about 90 weight percent, more preferably in the range of about 50 to about 80 weight percent, and even more preferably in the range of about 70 to about 75 weight percent, all based on the total with of the polymer, fibers and particles. A suitable amount of crosslinking agent is provided to reach the desired amount of crosslinking. Suitable amounts of dispersants, retarders, accelerents, and other additives may be provided as necessary or desired.

The polymer utilized in the practice of the present invention is preferably water soluble and must be capable of being pumped as a liquid and subsequently crosslinked in place to form a substantially non-flowing crosslinked polymer which has sufficient strength to withstand the pressures exerted on it. Moreover, it must have a network structure capable of incorporating reinforcing fibers.

The crosslinked polymer or "gel" resulting from the crosslinked polymer system of the present invention is a continuous three-dimensional crosslinked polymeric network, having an ultra high molecular weight, which confines the aqueous solvent component in its interstices. The polymeric network and aqueous component form a single phase system which provides the gel with its unique phase behavior.

The present gel is qualitatively defined as "flowing" because of its ability to flow into the wellbore and formation under injection pressure. Nevertheless, the gel has sufficient structure as a result of its specific crosslinking mechanism to exhibit characteristics desirable of a fracturing fluid. These characteristics include uniformity, high viscosity, shear thinning and stability during the fracture treatment as well as low fluid loss and friction loss.

The uniform viscous stable gel of the present invention is a particularly effective vehicle for propping agents, which may be employed during the fracture treatment, because the gel is advantageously susceptible to shear thinning. The gel exhibits high apparent viscosity in the wellbore tubulars during injection, but exhibits relatively low apparent viscosity when subjected to high shear as it exits the wellbore perforations and enters the induced fractures. The gel regains its high apparent viscosity as it moves at lower shear through the fractures far into the formation away from the wellbore. The shear thinning gel effectively maintains the proppant in suspension in the wellbore tubulars until the gel enters the induced fractures and again after the gel has traveled into the fractures.

The gel of the present invention is at least partially gelled upon injection into the wellbore. In a partial gel, as defined herein, the crosslinking agent has reacted incompletely with the polymer and neither all of the polymer nor all of the crosslinking agent in the gel is totally consumed by the crosslinking reaction. Although the partial gel exhibits at least some gel-like structure, it is capable of further crosslinking to completion without the addition of more crosslinking agent.

"Crosslinked to completion" means that the gel is substantially incapable of further crosslinking because one or both of the required reactants in the initial solution are substantially consumed. Further crosslinking is only possible if either polymer, crosslinking agent, or both are added to the gel. In a preferred embodiment, the gel of the present invention is crosslinked to substantial completion upon injection into the wellbore.

Complete gelation by the time the gel reaches the induced fractures is advantageous because it promotes efficient proppant transport and reduces fluid loss. Fluid loss can cause significant permeability reduction of the matrix bounding the fracture network which is counterproductive to the fracturing process. Fluid loss can also increase the fracturing fluid requirement of the treatment and cause undesirable proppant bridging in the fractures.

While any suitable water soluble polymer may be utilized, the preferred polymer utilized in the practice of the present invention is a carboxylate-containing polymer. This preferred carboxylate-containing polymer may be any crosslinkable, high molecular weight, water-soluble, synthetic polymer or biopolymer containing one or more carboxylate species.

For an example of a suitable polymer and crosslinking agent, and methods of making and using such in hydraulic fracturing, please see U.S. Pat. No. 4,779,680, herein incorporated by reference.

The average molecular weight of the carboxylate-containing polymer utilized in the practice of the present invention is in the range of about 10,000 to about 50,000,000, preferably in the range of about 100,000 to about 20,000,000, and most preferably in the range of about 200,000 to about 15,000,000.

Biopolymers useful in the present invention include polysaccharides and modified polysaccharides. Non-limiting examples of biopolymers are xanthan gum, guar gum, carboxymethylcellulose, o-carboxychitosans, hydroxyethylcellulose, hydroxypropylcellulose, and modified starches. Non-limiting examples of useful synthetic polymers include acrylamide polymers, such as polyacrylamide, partially hydrolyzed polyacrylamide and terpolymers containing acrylamide, acrylate, and a third species. As defined herein, polyacrylamide (PA) is an acrylamide polymer having substantially less than 1% of the acrylamide groups in the form of carboxylate groups. Partially hydrolyzed polyacrylamide (PHPA) is an acrylamide polymer having at least 1%, but not 100%, of the acrylamide groups in the form of carboxylate groups. The acrylamide polymer may be prepared according to any conventional method known in the art, but preferably has the specific properties of acrylamide polymer prepared according to the method disclosed by U.S. Pat. No. Re. 32,114 to Argabright et al incorporated herein by reference.

Any crosslinking agent suitable for use with the selected polymer may be utilized in the practice of the present invention. Preferably, the crosslinking agent utilized in the present invention is a chromic carboxylate complex.

The term "complex" is defined herein as an ion or molecule containing two or more interassociated ionic, radical or molecular species. A complex ion as a whole has a distinct electrical charge while a complex molecule is electrically neutral. The term "chromic carboxylate complex" encompasses a single complex, mixtures of complexes containing the same carboxylate species, and mixtures of complexes containing differing carboxylate species.

The chromic carboxylate complex useful in the practice of the present invention includes at least one or more electropositive chromium III species and one or more electronegative carboxylate species. The complex may advantageously also contain one or more electronegative hydroxide and/or oxygen species. It is believed that, when two or more chromium III species are present in the complex, the oxygen or hydroxide species may help to bridge the chromium III species. Each complex optionally contains additional species which are not essential to the polymer crosslinking function of the complex. For example, inorganic mono- and/or divalent ions, which function merely to balance the electrical charge of the complex, or one or more water molecules may be associated with each complex. Non-limiting representative formulae of such complexes include:

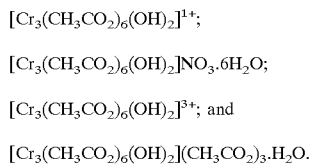

"Trivalent chromium" and "chromic ion" are equivalent terms encompassed by the term "chromium III" species as used herein.

The carboxylate species are advantageously derived from water-soluble salts of carboxylic acids, especially low molecular weight mono-basic acids. Carboxylate species derived from salts of formic, acetic, propionic, and lactic acid, substituted derivatives thereof and mixtures thereof are preferred. The preferred carboxylate species include the following water-soluble species: formate, acetate, propionate, lactate, substituted derivatives thereof, and mixtures thereof. Acetate is the most preferred carboxylate species. Examples of optional inorganic ions include sodium, sulfate, nitrate and chloride ions.

A host of complexes of the type described above and their method of preparation are well known in the leather tanning art. These complexes are described in Shuttleworth and Russel, Journal of the Society of Leather Trades' Chemists, "The Kinetics of Chrome Tannage Part I.," United Kingdom, 1965, v. 49, p. 133–154; "Part III.," United Kingdom, 1965, v. 49, p. 251–260; "Part IV.," United Kingdom, 1965, v. 49, p. 261–268; and Von Erdman, Das Leder, "Condensation of Mononuclear Chromium (III) Salts to Polynuclear Compounds," Eduard Roether Verlag, Darmstadt Germany, 1963, v. 14, p. 249; and incorporated herein by reference. Udy, Marvin J., Chromium. Volume 1: Chemistry of Chromium and its Compounds. Reinhold Publishing Corp., N.Y., 1956, pp. 229–233; and Cotton and Wilkinson, Advanced Inorganic Chemistry 3rd Ed., John Wiley and Sons, Inc., N.Y., 1972, pp. 836–839, further describe typical complexes which may be within the scope of the present invention and are incorporated herein by reference. The present invention is not limited to the specific complexes and mixtures thereof described in the references, but may include others satisfying the above-stated definition.

Salts of chromium and an inorganic monovalent anion, e.g., CrCl3, may also be combined with the crosslinking agent complex to accelerate gelation of the polymer solution, as described in U.S. Pat. No. 4,723,605 to Sydansk, which is incorporated herein by reference.

The molar ratio of carboxylate species to chromium III in the chromic carboxylate complexes used in the process of the present invention is typically in the range of 1:1 to 3.9:1. The preferred ratio is range of 2:1 to 3.9:1 and the most preferred ratio is 2.5:1 to 3.5:1.

The additive of the present invention may comprise fibers or comminuted particles of plant materials, and preferably comprises comminuted particles of one or more plant materials.

Fibers suitable for use in the present invention are selected from among hydrophilic and hydrophobic fibers. Incorporation of hydrophobic fibers will require use of a suitable wetting agent. Preferably, the fibers utilized in the present invention comprise hydrophilic fibers, most preferably both hydrophilic and hydrophobic fibers.

With respect to any particular fiber employed in the practice of the present invention, it is believed that the longer the fiber, the more difficult it is to be mixed uniformly in solution. It is believed that fibers as long as 12,500 microns may tend to aggregate and form clumps. The shorter the fiber, it is believed the easier it is to mix in solution. On the other hand, the shorter the fiber, the greater the quantity necessary to provide the desired level of strength in a reinforced mature gel. In general, the fibers utilized in the present invention will have a length in the range of 100 microns to 3200 microns, preferable 100 microns to 1000 microns.

Non-limiting examples of suitable hydrophobic fibers include nylon, rayon, hydrocarbon fibers and mixtures thereof.

Non-limiting examples of suitable hydrophilic fibers include glass, cellulose, carbon, silicon, graphite, calcined petroleum coke, cotton fibers, and mixtures thereof.

Non-limiting examples of comminuted particles of plant materials suitable for use in the present invention include any derived from: nut and seed shells or hulls such as those of peanut, almond, brazil, cocoa bean, coconut, cotton, flax, grass, linseed, maize, millet, oat, peach, peanut, rice, rye, soybean, sunflower, walnut, wheat; various portions of rice including the rice tips, rice straw and rice bran; crude pectate pulp; peat moss fibers; flax; cotton; cotton linters; wool; sugar cane; paper; bagasse; bamboo; corn stalks; various tree portions including sawdust, wood or bark; straw; cork; dehydrated vegetable matter (suitably dehydrated carbonhydrates such as citrus pulp, oatmeal, tapioca, rice grains, potatoes, carrots, beets, and various grain sorghams); whole ground corn cobs; or various plant portions the corn cob light density pith core, the corn cob ground woody ring portion, the corn cob coarse or fine chaff portion, cotton seed stems, flax stems, wheat stems, sunflower seed stems, soybean stems, maize stems, rye grass stems, millet stems, and various mixtures of these materials.

Optionally, dispersant for comminuted plant material will be utilized the in the range of about 1 to about 20 pounds, preferably in the range of about 5 to about 10 pounds, and more preferably in the range of about 7 to about 8 pounds of dispersant may be utilized per pound of comminuted plant material. A non-limiting example of a suitable dispersant is NaCl.

Preferred comminuted materials useful in the practice of the present invention include those derived from peanuts, wood, paper any portion of rice seed or plant, and any portion of corn cobs.

These various materials can be comminuted to very fine particle sizes by drying the products and using hammer mills, cutter heads, air control mills or other comminution methods as is well known to those of skill in the comminution art. Air classification equipment or other means can be used for separation of desired ranges of particle sizes using techniques well-known in the comminution art.

Any suitable size of comminuted material may be utilized in the present invention, along as such size produces results which are desired. In most instances, the size range of the comminuted materials utilized herein will range from below about 8 mesh ("mesh" as used herein refers to standard U.S. mesh), preferably from about −65 mesh to about −100 mesh, and more preferably from about −65 mesh to about −85 mesh. Specifically preferred particle sizes for some materials are provided below.

Preferred mixtures of comminuted materials useful in the practice of the present invention include a rice fraction and peanut hulls; a rice fraction and wood fiber and/or almond hulls; a rice fraction and a corn cob fraction, preferably a chaff portion; and a corn cob fraction, preferably a pith or chaff portion, a rice fraction, and at least one of wood fiber, nut shells, paper and shredded cellophane.

Rice is commercially available in the form of rice hulls, rice tips, rice straw and rice bran, as these various parts of the rice plant are separated commercially and are widely available from rice mills. Preferably, the size range of the rice fraction utilized herein will range from below about 8 mesh ("mesh" as used herein refers to standard U.S. mesh), preferably from about −65 mesh to about −100 mesh, and more preferably from about −65 mesh to about −85 mesh.

After the corn kernels are removed, corn cobs consist of four principle parts that are arranged concentrically. The central portion is a very light density pith core, that is surrounded by a woody ring, that in turn is surrounded by a coarse chaff portion, that in turn is covered by a fine chaff portion. The coarse and fine chaff portions form the sockets for anchoring the corn kernels to the corncob. The normal methods of grinding corncobs produce a mixture of all four parts enumerated above. It is possible, however, to separate the woody ring material from the remainder of the cob. The chaff portion of the corncob remaining after removal of the woody ring material is known as "bees wings". In the present invention, any of the pith or chaff portions("BPC") are the preferred portions of the corn cob, with the chaff portions being more preferred. A range of particle sizes of pith and chaff can be obtained from comminution, but the size range smaller than about 8 mesh is suitable for this invention. Preferably, a particle size distribution ranging from smaller than 8 mesh to smaller than 100 mesh is utilized.

Preferred woods for use as comminuted materials in the present invention include any type of hard wood fiber, including cedar fiber, oak fiber, pecan fiber and elm fiber. Preferably the wood fiber comprises cedar fibers.

Preferred nut shells for use in the present invention include pecan, walnut, and almond. Preferably, the nut shells comprise at least one of pecan or walnut shells.

Preferred particle sizes for the wood fibers, nut shells, paper and cellophane will generally range from about +10 mesh to −100 mesh. An illustration of a non-limiting particle size distribution for these materials would include particles of +10 mesh, +20 mesh, +30 mesh, +50 mesh, +60 mesh, +100 mesh, and −100 mesh.

For one of the preferred comminuted plant mixtures comprising a corn cob fraction, a rice fraction, and at least one of wood fiber, nut shells, paper and shredded cellophane, the mixture will generally comprise in the range of about 5 to about 95 weight percent rice, in the range of about 5 to about 95 weight percent corncob pith or chaff, with the total of ground wood fiber, ground nut shells, ground paper and shredded cellophane comprising in the range of about 5 to about 95 weight percent (weight percent based on the total weight of plant material in the mixture. Preferred ranges are about 20 to about 75 weight percent rice, about 5 to about 35 weight percent corncob pith or chaff, with the total of ground wood fiber, ground nut shells, ground paper and shredded cellophane comprising in the range of about 20 to about 75 weight percent. More preferred ranges are about 30 to about 50 weight percent rice, about 10 to about 30 weight percent corncob pith and chaff, with the total of ground wood fiber, ground nut shells, ground paper and shredded cellophane comprising in the range of about 25 to about 50 weight percent.

As these comminuted materials are to be added to a water base hydraulic fracturing fluid, a small amount of oil may optionally added to the mixture. This optional oil is preferably added while the plant materials are being mixed together. This mixing may take place in a ribbon blender, where the oil in the required amount is applied by a spray bar. The oil wets the particles and adds to their lubricity while at the same time helping to control dust produced by the mixing operation. A variety of oils may be utilized in the practice of the present invention in concentrations generally ranging from about 1 percent to about 5 percent by weight based on the total weight of the mixture of comminuted materials, more preferably ranging from about 1 percent to about 2 percent. A non-limiting example of a commercially available oil suitable for use in the present invention includes ISOPAR V, available from Exxon Corporation.

The various components of the present invention may be mixed in any suitable order utilizing mixing techniques as known to those in the art, including dry mixing of the various components prior to addition to water, or alternatively, either or both of the polymer and cross-linking agent may be utilized as a solution. Most preferably, the various components are mixed in dry form, and then contacted with water or aqueous solution to form a hydraulic fracturing fluid. This hydraulic fracturing fluid is then injected into the well as is known in the art.

The hydraulic fracturing fluid of the present invention may optionally include proppants as are known to those of skill in the art, and/or breakers as are known to those of skill in the art.

Water or an aqueous may be contacted with the additive to form the hydraulic fracturing fluid. Non-limiting examples of suitable aqueous solutions include deionized water, fresh water or a brine having a total dissolved solids concentration up to the solubility limit of the solids in water.

The breaker is preferably a composition which is sufficiently reactive to effectively break the gel within about 48 hours after the fracture treatment, yet not so reactive that it significantly diminishes the performance properties of the gel during the fracture treatment. Suitable breakers include those known in the art. The gel breaker reverses the gel to a less viscous solution upon completion of the fracture treatment. The less viscous solution is readily removed from the fractures so that injected or produced fluids may flow into or out of the fractures.

The propping agent can be any suitable composition known in the art. Conventional propping agents include sand, glass beads, ceramic beads, cracked walnut shells, etc. The proppant keeps the fractures open without substantially blocking fluid flow after the degraded gel is removed.

The present process enables a practitioner to prepare a fracturing fluid from the above-described components which exhibits effective predetermined performance properties. Effective performance properties include low fluid, low friction loss, high shear thinning, high proppant carrying capacity and a resonable gelation rate.

With the present invention, one can produce effective fracturing fluids as a function of the gel composition and gelation conditions. Thus, to effect an optimum fracture treatment according to the present process, the practitioner predetermines the performance properties of a gel which are required to meet the fracture treatment demands of the given formation and thereafter produces a gel having these predetermined properties by selecting the gel composition and gelation conditions accordingly.

The present process is applicable to fracture treatments of formations under most conditions and is specific to fracturing a formation which is in fluid communication with an injection or production well. The gels are produced in a manner which renders them insensitive to most extreme formation conditions. The gels can be stable at formation temperatures up to 115° C. and beyond and at any formation pH contemplated. The gels are relatively insensitive to oil field fluids and the stratigraphy of the rock. The gels can be employed in carbonate and sandstone strata or strata having varying mineralogy.

Upon completion of the fracturing process, the gels can be removed from the fractures by producing them back through the wellbore. The gels are preferably degraded to a less viscous solution before backflowing. Conventional chemical breakers to degrade the gels are either incorporated into the gelation solution during its preparation or separately injected into the treatment region after the fracture treatment. As an alternative to backflowing, the gels can be degraded and displaced out into the formation away from the treatment region. In any case, the gels do not substantially reduce the permeability of the formation near the wellbore or the resultant fracture after the fracture treatment.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which this invention pertains.

I claim:

1. A method for hydraulically fracturing a subterranean hydrocarbon bearing formation below an earthen surface in fluid communication with a wellbore comprising:
    (a) providing a hydraulic fracturing additive comprising a dry mixture of water soluble crosslinkable polymer, a crosslinking agent, and a reinforcing material selected from among fibers and comminuted plant materials;
    (b) contacting the hydraulic fracturing additive with water or an aqueous solution to form a hydraulic fracturing fluid; and
    (c) injecting the hydraulic fracturing fluid into said formation via said wellbore at a pressure sufficient to hydraulically fracture said formation.

2. The method of claim 1 wherein the polymer is an a carboxylate-containing polymer and the crosslinking agent is a chromic carboxylate complex.

3. The method of claim 2 wherein the reinforcing material comprises hydrophilic and hydrophobic fibers.

4. The method of claim 3 wherein the hydrophobic fibers comprise at least one selected from the group of hydrophobic fibers consisting of nylon, rayon, and hydrocarbon fibers, and wherein the hydrophilic fibers comprise at least one selected from the group of hydrophilic fibers consisting of glass, cellulose, carbon, silicon, graphite, calcined petroleum coke, and cotton fibers.

5. The method of claim 2 wherein the reinforcing material comprises comminuted plant material.

6. The method of claim 5 wherein the reinforcing material comprises at least one comminuted material selected from the group of comminuted plant materials consisting of nut and seed shells or hulls of almond, brazil, cocoa bean, coconut, cotton, flax, grass, linseed, maize, millet, oat, peach, peanut, rice, rye, soybean, sunflower, walnut, and wheat; rice tips; rice straw; rice bran; crude pectate pulp; peat moss fibers; flax; cotton; cotton linters; wool; sugar cane; paper; bagasse; bamboo; corn stalks; sawdust; wood; bark; straw; cork; dehydrated vegetable matter; whole ground corn cobs; corn cob light density pith core; corn cob ground woody ring portion; corn cob chaff portion; cotton seed stems; flax stems; wheat stems; sunflower seed stems; soybean stems; maize stems; rye grass stems; millet stems; and mixtures thereof.

7. The method of claim 2 wherein the polymer is a partially hydrolyzed polyacrylamide.

8. The method of claim 7 wherein the reinforcing material is a comminuted material selected from among comminuted materials derived from peanuts, wood, paper any portion of rice seed or plant, any portion of corn cobs, and mixtures thereof.

9. The method of claim 8 wherein the additive further includes cellophane, and wherein the reinforcing material is a comminuted material selected from among mixtures of comminuted rice fraction and peanut hulls; mixtures of comminuted rice fraction, and wood fiber or almond hulls; mixtures of comminuted rice fraction and corn cob fraction; and mixtures of comminuted rice fraction and corn cob fraction and at least one of wood fiber, nut shells, and paper.

10. The method of claim 9 wherein the reinforcing material comprises comminuted mixture of rice fraction, corn cob pith and chaff, cedar fiber, nut shells, and paper.

11. A method for hydraulically fracturing a subterranean hydrocarbon bearing formation below an earthen surface in fluid communication with a wellbore comprising:
    (a) providing a hydraulic fracturing fluid comprising an aqueous solution of water soluble crosslinkable polymer, a crosslinking agent, and a reinforcing material selected from among fibers and comminuted plant materials; and
    (b) injecting the hydraulic fracturing fluid into said formation via said wellbore at a pressure sufficient to hydraulically fracture said formation.

12. The method of claim 11 wherein the polymer is an a carboxylate-containing polymer and the crosslinking agent is a chromic carboxylate complex.

13. The method of claim 12 wherein the reinforcing material comprises hydrophilic and hydrophobic fibers.

14. The method of claim 13 wherein the hydrophobic fibers comprise at least one selected from the group of hydrophobic fibers consisting of nylon, rayon, and hydrocarbon fibers, and wherein the hydrophilic fibers comprise at least one selected from the group of hydrophilic fibers consisting of glass, cellulose, carbon, silicon, graphite, calcined petroleum coke, and cotton fibers.

15. The method of claim 12 wherein the reinforcing material comprises comminuted plant material.

16. The method of claim 15 wherein the reinforcing material comprises at least one comminuted material selected from the group of comminuted plant materials consisting of nut and seed shells or hulls of almond, brazil, cocoa bean, coconut, cotton, flax, grass, linseed, maize, millet, oat, peach, peanut, rice, rye, soybean, sunflower, walnut, and wheat; rice tips; rice straw; rice bran; crude pectate pulp; peat moss fibers; flax; cotton; cotton linters; wool; sugar cane; paper; bagasse; bamboo; corn stalks; sawdust; wood; bark; straw; cork; dehydrated vegetable matter; whole ground corn cobs; corn cob light density pith core; corn cob ground woody ring portion; corn cob chaff portion; cotton seed stems; flax stems; wheat stems; sunflower seed stems; soybean stems; maize stems; rye grass stems; millet stems; and mixtures thereof.

17. The method of claim 12 wherein the polymer is a partially hydrolyzed polyacrylamide.

18. The method of claim 17 wherein the reinforcing material is a comminuted material selected from among comminuted materials derived from peanuts, wood, paper any portion of rice seed or plant, any portion of corn cobs, and mixtures thereof.

19. The method of claim 18 wherein the additive further includes cellophane, and wherein the reinforcing material is a comminuted material selected from among mixtures of comminuted rice fraction and peanut hulls; mixtures of comminuted rice fraction, and wood fiber or almond hulls; mixtures of comminuted rice fraction and corn cob fraction; and mixtures of comminuted rice fraction and corn cob fraction and at least one of wood fiber, nut shells, and paper.

20. The method of claim 19 wherein the reinforcing material comprises comminuted mixture of rice fraction, corn cob pith and chaff, cedar fiber, nut shells, and paper.

* * * * *